Jan. 18, 1938.    R. L. WELCH ET AL    2,105,712
HYDRAULIC BRAKE
Filed July 18, 1936    2 Sheets-Sheet 2
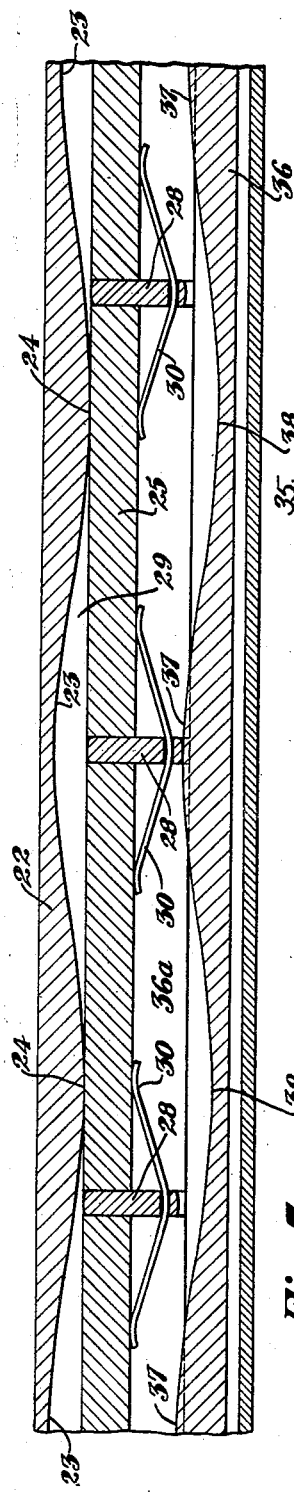
Fig. 7
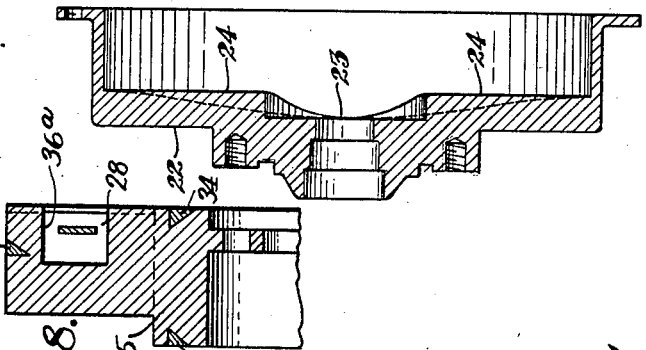
Fig. 6
Fig. 8
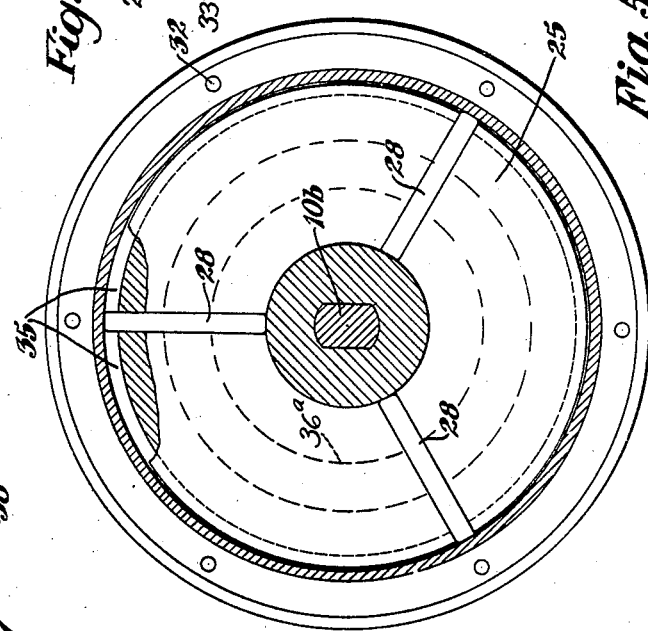
Fig. 5
Inventors
Robert L. Welch and
John T. Shoup
By Freese and Bishop
Attorneys Patented Jan. 18, 1938

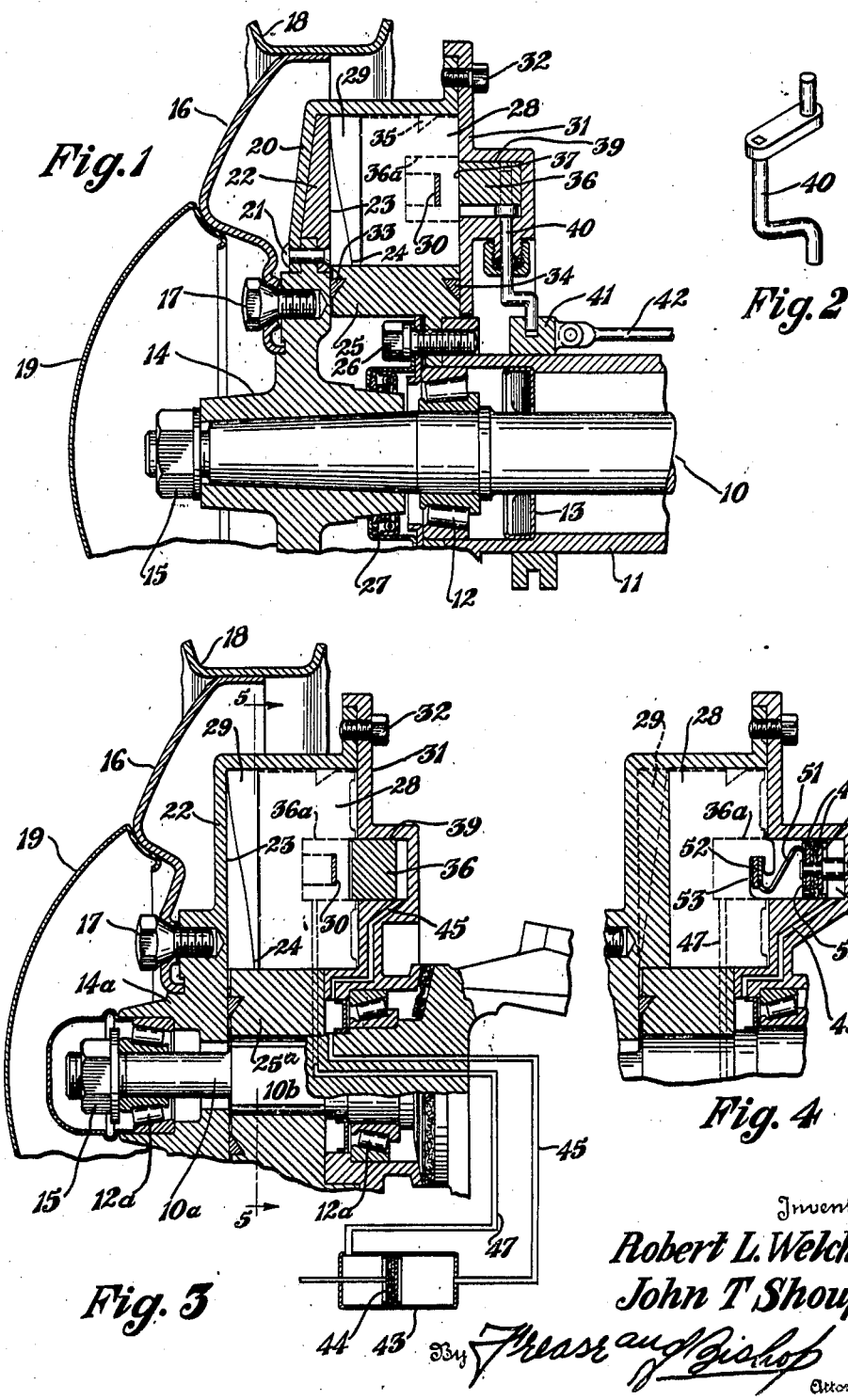

2,105,712

UNITED STATES PATENT OFFICE 2,105,712

HYDRAULIC BRAKE

Robert L. Welch and John T. Shoup, Canton, Ohio

Application July 18, 1936, Serial No. 91,372

9 Claims. (Cl. 188—90)

The invention relates to fluid brakes of the general type in which fluid under pressure is used as the braking means, and more particularly to a brake especially adapted for automobiles and similar vehicles.

The object of the invention is to provide a brake including a stationary member and a relatively rotary member, one of which is provided with a fluid chamber having one or more recesses therein, the other member carrying one or more vanes or valves adapted to be slidably moved into the chamber.

Another object is to provide a brake of this character in which the recesses in the fluid chamber are located diametrically opposite to each other and the sliding vanes or blades are equally spaced around the other member, whereby the wheel in which the brake is mounted will be evenly balanced, permitting either of the members to be rotated relative to the other without producing unnecessary vibration.

It is known that attempts have been made to provide brakes of this general character in which the fluid chamber surrounds the periphery of the member provided with the sliding vanes or blades, the vanes being arranged to slide outward along radial lines. Such brakes, however, are subject to centrifugal force, which tends to throw the vanes outward into the fluid chamber, producing a turbulence of the fluid which causes vibration and produces a braking action when not desired.

A principal object of this invention is to overcome such objectionable features by locating the fluid chamber at one side of the member carrying the sliding vanes and arranging for lateral movement of the vanes into said chamber, thus preventing any movement of the vanes due to centrifugal force.

Another object is to provide an operating ring for the vanes stationary relative to the fluid chamber and having a contour corresponding to that of the fluid chamber.

A further object is to provide either hydraulic or mechanical means for operating said vane operating ring to apply the brake.

A still further object is to provide a flexible vane operating ring.

Another object is to provide a brake of this character which may be built into an automobile wheel or which may be applied to an automobile wheel of standard design.

The above objects, together with others which will be apparent from the drawings and following description or which may be hereinafter referred to, may be attained by constructing the improved brake as in the embodiment illustrated in the accompanying drawings, in which Figure 1 is a sectional view of a brake embodying the invention as applied to an automobile rear wheel of standard make, showing mechanical means for operating the vane operating ring;

Fig. 2, a detail perspective view of the crankshaft forming a part of the ring operating means;

Fig. 3, a sectional view of a front wheel of an automobile with the improved brake built therein, showing hydraulic means for operating the vane operating ring;

Fig. 4, a fragmentary sectional view showing a modified form of flexible vane operating ring;

Fig. 5, a section taken as on the line 5—5, Fig. 3;

Fig. 6, a detached sectional view of the brake member provided with the fluid chamber;

Fig. 7, a flat development of the improved brake mechanism, and

Fig. 8, a transverse section through one half of the stationary member which carries the vanes.

Similar numerals refer to similar parts throughout the drawings.

Referring first to Fig. 1 of the drawings, a portion of a rear axle is indicated at 10, surrounded by the usual axle housing 11, within which the axle is rotatably mounted as by the roller bearing 12, an oil retainer 13 of usual construction being provided for retaining the lubricating oil or grease within the axle housing. The wheel hub 14 is keyed upon the axle 10 as in usual manner and held against end movement upon the axle as by the usual nut 15.

The wheel proper is of the pressed steel type now in general use as indicated at 16 and is attached to the hub as by the usual screws 17, the rim 18 being connected to the periphery of said wheel. The hub cap 19 is of usual and ordinary construction and the brake drum 20 is shown attached to the wheel hub by the usual rivets 21. All of the above parts may be of any usual and ordinary construction of automobile wheel now in general use and are shown for the purpose of illustrating the manner in which the improved brake may be applied to such a wheel.

For the purpose of providing the improved brake to which the invention pertains, an annular member 22 in Fig. 1 is fixed within the brake drum 20 to produce a fluid chamber of the desired contour, said member 22 being provided with two diametrically opposite recesses 23 and with the intervening high points 24 having a sliding fit against the relatively stationary annular member 25 which may be connected to the stationary axle housing 11 as by the screws 26, and is of the cross sectional shape best shown in Fig. 8. An oil seal, as indicated at 27, may be provided between the stationary member 25 and the wheel hub 14.

A plurality of vanes or valves 28, preferably three as shown in Figs. 5 and 7, is slidably mounted through suitable slots in the stationary member 25 and adapted to be moved laterally into the fluid chamber 29 formed in the relatively rotary member 22, springs 30 or their equivalents being preferably provided for normally holding said vanes in the inoperative position as illustrated in the drawings, the rear edges of said vanes being thus normally held back against the annulus 31, which is fixed to the brake drum as by screws 32 and has a sliding fit against the rear or inner side of the stationary member 25.

Sealing rings 33 and 34 may be provided to form liquid seals between opposite sides of the stationary member 25, and the hub 14 and annulus 31 respectively, these rings being preferably of triangular or wedge-shape as illustrated. Similarly shaped sealing segments 35 are preferably provided between the periphery of the stationary member 25 and the brake drum 20, being located between the vanes 28, as shown.

For the purpose of slidably moving the vanes 28 into the fluid chamber, an operating ring 36 may be provided, the contour of the operating face thereof corresponding to that of the member 22, the ring having the high points 37 corresponding to the recesses 23 of the member 22 and the low points 38 corresponding to the high points 24 thereof. This ring may be normally mounted within an annular recess 39 formed for the purpose in the annulus 31 and may be arranged to be moved laterally by any suitable means, such as the crankshafts 40 operated by the grooved ring 41 adapted to be laterally moved upon the rear axle housing 11 as through a link 42 operatively connected in any usual and well known manner to a brake pedal or the like. The crankshafts 40 will prevent the ring 36 from rotating relative to the member 31.

When the automobile is in motion, the parts are normally in the position shown in Fig. 1, the member 22 and operating ring 36 rotating with the wheel while the member 25 carrying the vanes 28 remains stationary relative thereto. When the brakes are applied, the grooved ring 41 is slidably moved upon the axle housing 11, to the left as viewed in Fig. 1, and through the crankshafts 40 the vane operating ring 36 is moved in the same direction, into the annular groove 36a in the annular member 25, laterally sliding the vanes 28 into the fluid chamber 29 and substantially into contact with the inner face of the member 22.

As the vanes pass through the fluid chamber 29 and thereby engage the oil or other suitable fluid contained within said chamber, said fluid will be carried forward by the projecting portion of said vane and compressed, owing to the configuration of the chamber, or if said vane is projecting but slightly beyond the face of the member 25, the fluid in advance thereof will escape to the rear of said vane with a consequent retardation of the rotary member or a sudden checking thereof according to the degree to which said vane is projected into the chamber.

In Fig. 3 is illustrated the manner in which an automobile front wheel may be built in accordance with the invention. The spindle is illustrated at 10a and the wheel hub 14a is rotatably mounted thereon in usual and well known manner as by the roller bearings 12a and retained against end movement upon the spindle as by the usual nut 15. The wheel 16 is attached to the hub in usual manner as by the screws 17 and carries the rim 18, a hub cap 19 being provided to cover the hub and central portion of the wheel.

The rotary member 22 may be formed integral with the hub and the inner contour thereof may be as above described, having the low points 23 and high points 24. The stationary member 25a may be fixed upon a flattened portion 10b of the spindle and is provided with the vanes 28 normally retracted by the springs 30 as above described.

The vanes are adapted to be operated by the ring 36 normally located within the recess 39 of the annulus 31 which is connected to the member 22 as by the screws 32. The ring 36 may be mechanically operated as illustrated in Fig. 1 or may be hydraulically operated as illustrated in Fig. 3. If hydraulically operated, the ring 36 may be prevented from rotating relative to the member 31 by any usual and well known means such as a key or pin.

For this purpose, a hydraulic cylinder 43 may be provided with a piston or plunger 44 adapted to be operated in any usual and well known manner by the operation of the ordinary brake pedal and connected by a fluid line 45 with the rear or inner side of the recess 39 so as to apply fluid pressure back of the ring 36 to move it laterally into the annular recess 36a formed in the member 25. If desired, the other end of the cylinder 43 may be connected by an oil line 47 with the front or outer end of the recess 36a.

As shown in Fig. 4, a flexible operating ring may be provided for operating the vanes. All of the other parts may be as above described, and similar reference numerals are applied to Fig. 4 to indicate the same. The operating ring may comprise a pair of leather rings 48 preferably backed by a flexible metallic ring 49 and having another flexible metallic ring 50 fixed to the other side thereof and provided at spaced intervals with fingers 51 connected to a flexible ring 52 slidably received within the notches 53 formed in the vanes 28. The ring 48 is connected, preferably at two diametrically spaced points, corresponding to the high points 24 of the member 22, to the inner wall of the annular recess 39 as by the rivets 54.

A hydraulic cylinder, such as illustrated in Fig. 3, is adapted to be connected to the rear or inner side of the recess 39 by the fluid line 45 and to the forward or outer side of the recess 36a as by the fluid line 47.

It will be seen that when fluid pressure is applied through the line 45 to the rear side of the flexible ring 49, this ring will be flexed outward or forward between the fixed points 54, and corresponding to the recesses 23 in the member 22, thus moving the vanes 28 into the fluid chamber 29 and causing them to follow the inner contour of the member 22. When the fluid pressure is admitted through the fluid line 47 in front of the flexible ring 48, the same will be moved back to normal position, retracting the vanes 28 from the fluid chamber.

We claim:

1. A device of the character described including two members located laterally of each other, one of the members being mounted for rotation relative to the other member, a fluid chamber between said members, diametrically opposed high points upon one member projecting into said chamber, vanes carried by the other member slidable into said chamber, and operating means to project said vanes laterally into said chamber, said operating means formed to permit retraction of the vanes as they approach and pass said high points.

2. A device of the character described including two members located laterally of each other, one of the members being mounted for rotation relative to the other member, a fluid chamber between said members, a high point upon one member projecting into said chamber, a vane carried by the other member slidable into said chamber, and an operating ring having a contour corresponding to the member with the high point and stationary relative thereto for projecting said vane laterally into said chamber and permitting retraction of said vane as it approaches and passes said high point.

3. A device of the character described including two members located laterally of each other, one of the members being mounted for rotation relative to the other member, a fluid chamber between said members, diametrically opposed high points upon one member projecting into said chamber, vanes carried by the other member slidable into said chamber, and an operating ring having a contour corresponding to the member with the high points and stationary relative thereto for projecting said vanes laterally into said chamber and permitting retraction of said vanes as they approach and pass said high points.

4. A device of the character described including a member having an annular channel therein and an annular member located within the channel member, one of said members being mounted for rotation relative to the other member, a fluid chamber within the channel member, diametrically opposite high points projecting laterally from an inner side wall of the channel member into said fluid chamber, vanes carried by the other member slidable into said chamber, and operating means to project said vanes laterally into said chamber, said operating means formed to permit retraction of the vanes as they approach and pass said high points.

5. A device of the character described including a member having an annular channel therein and an annular member located within the channel member, one of said members being mounted for rotation relative to the other member, a fluid chamber within the channel member, a high point projecting laterally from an inner side wall of the channel member into said fluid chamber, a vane carried by the other member slidable into said chamber and an operating ring within the channel member having a contour corresponding to said inner side wall thereof and stationary relative thereto for projecting said vane laterally into said chamber and permitting retraction of said vane as it approaches and passes said high point.

6. A device of the character described including a member having an annular channel therein and an annular member located within the channel member, one of said members being mounted for rotation relative to the other member, a fluid chamber within the channel member, a high point projecting laterally from an inner side wall of the channel member into said fluid chamber, a vane carried by the other member slidable into said chamber, a flexible operating ring within said channel member and fixed thereto at a point laterally alined with said high point and means for flexing said ring for projecting said vane laterally into said chamber and permitting retraction of said vane as it approaches and passes said high point.

7. A device of the character described including a member having an annular channel therein and an annular member located within the channel member, one of said members being mounted for rotation relative to the other member, a fluid chamber within the channel member, diametrically opposite high points projecting laterally from an inner side wall of the channel member into said fluid chamber, vanes carried by the other member slidable into said chamber, a flexible operating ring within the channel member and fixed thereto at points laterally alined with said high points and means for flexing said ring to project said vanes laterally into said chamber and to permit retraction of the vanes as they approach and pass said high points.

8. A device of the character described including two members located laterally of each other, one of the members being mounted for rotation relative to the other member, a fluid chamber between said members, a high point upon one member projecting into said chamber, a vane carried by the other member slidable into said chamber, a flexible operating ring connected to the member having the high point at a point laterally alined therewith and means for flexing said ring for projecting said vane laterally into said chamber and permitting retraction of said vane as it approaches and passes said high point.

9. A device of the character described including a member having an annular channel therein and an annular member located within the channel member, one of said members being mounted for rotation relative to the other member, a fluid chamber within the channel member, a high point projecting laterally from an inner side wall of the channel member into said fluid chamber, a vane carried by the other member slidable into said chamber, there being an annular groove in the opposite inner side wall of the channel member, and an operating ring having a contour corresponding to the first named inner side wall and stationary relative thereto for projecting said vane laterally into said chamber and permitting retraction of said vane as it approaches and passes said high point.

ROBERT L. WELCH.
JOHN T. SHOUP.